United States Patent [19]

Eisden

[11] 4,222,825
[45] Sep. 16, 1980

[54] PROCESS AND AN INSTALLATION FOR THE TREATMENT OF WATER

[75] Inventor: Remilio L. Eisden, Willemstad, Curaçao, Netherlands Antilles

[73] Assignee: Eilandgebied Curaçao, Willemstad, Curaçao, Netherlands Antilles

[21] Appl. No.: 28,675

[22] Filed: Apr. 10, 1979

Related U.S. Application Data

[63] Continuation of Ser. No. 802,950, Jun. 2, 1977, abandoned.

[30] Foreign Application Priority Data

Jun. 2, 1976 [NL] Netherlands ......................... 7605952

[51] Int. Cl.² ............................................. C02B 1/04
[52] U.S. Cl. ....................................... 203/11; 203/42;
 203/88; 203/DIG. 14; 203/DIG. 17; 202/183;
 202/202; 202/203; 261/DIG. 7
[58] Field of Search .................... 203/11, 88, 73, 42,
 203/DIG. 14, DIG. 17, 49, 7, 91; 202/185 A,
 183, 184, 201, 202, 203, 205, 173, 174;
 261/DIG. 7

[56] References Cited

U.S. PATENT DOCUMENTS

| | | | |
|---|---|---|---|
| 851,160 | 4/1907 | Chase | 202/203 |
| 2,388,599 | 11/1945 | Cleaver et al. | 202/174 |
| 2,759,882 | 5/1956 | Worthen et al. | 202/174 |
| 3,206,379 | 9/1965 | Hill | 202/173 |
| 3,216,910 | 11/1965 | Langer et al. | 202/173 |
| 3,218,241 | 11/1965 | Checkovich | 203/7 |
| 3,468,761 | 9/1969 | Stalcup | 203/DIG. 14 |
| 3,553,084 | 1/1971 | Creskoff | 202/203 |
| 3,816,266 | 6/1974 | Izumi et al. | 202/173 |
| 4,040,342 | 8/1977 | Austin et al. | 261/DIG. 7 |

*Primary Examiner*—Wilbur L. Bascomb, Jr.

[57] ABSTRACT

A process and installation for the treatment of distillate water recovered by flash evaporation from impure water, such as sea water, in which gases desorbed during the flash evaporation, including carbon dioxide, are recovered and intermixed with the distillate water prior to and inside an absorber so that the carbon dioxide is absorbed by distillate water to thereby improve the property of the distillate water for human consumption.

5 Claims, 2 Drawing Figures

PROCESS AND AN INSTALLATION FOR THE TREATMENT OF WATER

This is a continuation of application Ser. No. 802,950, filed June 2, 1977, and now abandoned.

The present invention relates to a process of and an installation for treating water subsequent to flash evaporation.

The treatment of seawater, brine, brackish waters, waste waters and contaminated effluent waters is gaining more and more importance for environmental and economic reasons. In order to recover water which is usable by humans, so-called potable water, several processes are known, which are of considerable importance for dry areas, coastal regions and sea islands, and such processes comprise distillation, electrolytic and/or osmotic or reverse osmotic processes.

Methods for the recovery of fresh potable water from salt water, such as seawater, are described in R. H. Perry and C. H. Chilton, "Chemical Engineers' Handbook", 5th Ed., Mc Graw-Hill, New York - London, 1973, Chapter 11, pages 34 and following.

A very convenient method is flash evaporation, in which seawater or other impure water is first directed through a heat transfer tube bundle, then led through a steam heated heater, and subsequently led through a steam heated heater, and subsequently directed through an orifice into a flash chamber where concentrated brine or contaminated water is obtained in the sump, while pure fresh water is recovered at one or several condensation trays, from which said fresh water is drained off.

A major disadvantage of this method consists in the fact, that the gases, originally absorbed or dissolved in the water to be treated, are also removed, such that the distillate contains no gases anymore or at least too small amounts of carbon dioxide, such that the distillate does not possess the properties necessary for human consumption. One of these properties is a certain hardness, which cannot be inherent in the water, if no carbon dioxide is present.

The main object of the present invention is to provide a method of and an installation for treating recovered water, obtained by the evaporation, such that the pure water will have a certain degree of absorbed or dissolved carbon dioxide, in order to render a degree of hardness thereto, and of other desired properties.

Another object of the present invention is to provide a method of and installation for obtaining the carbon dioxide, which is used for the carbonating of recovered fresh water, from seawater, salt water or other contaminated water subsequent to flash evaporation.

The known processes for the removal of carbon dioxide from seawater have the disadvantage, that they are uneconomical, since investments for same are very high, and energy consumption is equally high.

In the processes according to the prior art for the recovery of potable water from seawater it has been mentioned, that the water should be degassed, but said process was uneconomical too, and it had not been discerned hitherto, that the recovered fresh water should comprise a certain amount of carbon dioxide.

Seawater is constantly in heavy motion and in contact with the atmosphere, such that there is an equilibrium between the gasses of the atmosphere and the gasses dissolved in said seawater.

The gasses of the atmosphere are nitrogen, oxygen, carbon dioxide, and for the balance noble gasses, mainly argon, and hydrogen. The contents of nitrogen is 78.03% by volume, of oxygen 20.99% by volume and of carbon dioxide 0.03% by volume.

All the gasses dissolve in seawater, brackish water and other water to a certain amount. The dissolved amount depends on the patial pressure of the gas, the type of the gas, and also of the nature and amounts of other components of the water, amongst which an important parameter is the chloride contents.

The carbon dioxide is not only dissolved as such in the water, but is also present in dissolved compounds, such as salts, namely carbonates and hydrocarbonates, and it reacts also with certain components of the water. This means, that the carbon dioxide is present in seawater and in other natural or waste waters in the form of an absorbed gas as well as in the form of constituents or components of compounds dissolved in said water to a certain degree.

In seawater for example there are in total 49 different elements, amongst which there are calcium ions. When heating seawater boiler scale ($CaCO_3$) will be formed. In order to prevent a too extensive formation of boiler scale all the carbon dioxide gas as well as the chemically bound carbon dioxide should be removed from the water. This can be done by acidification and by flash evaporation according to known methods. Up to now a considerable amount of carbon dioxide has been removed by these methods without any economical re-use of said carbon dioxide.

The present invention provides an improved method and installation for the treatment of water subsequent to flash evaporation, and is characterized in that the gasses removed during said flash evaporation are recovered and absorbed in the distillate or in other pure water such that the carbon dioxide is mainly absorbed in same, whereby the properties of said water are improved.

The recovery of the gas is effected by means of an ejector condensor.

Reference is made to the enclosed drawings, of which

REFERRING NOW TO THE DRAWINGS IN DETAIL

Figure 1:
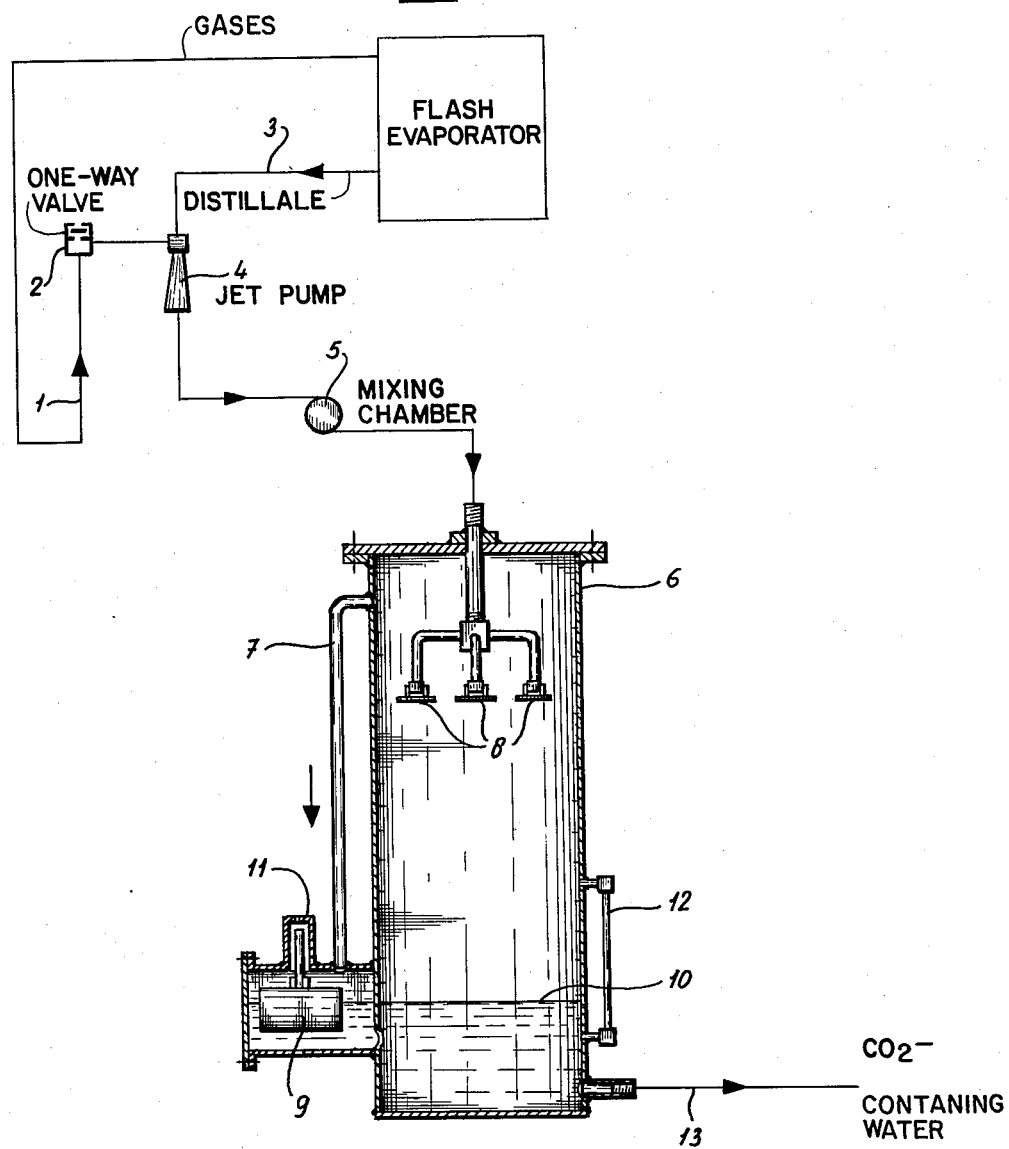
FIG. 1 shows a diagrammatic view of the process.
Figure 2:
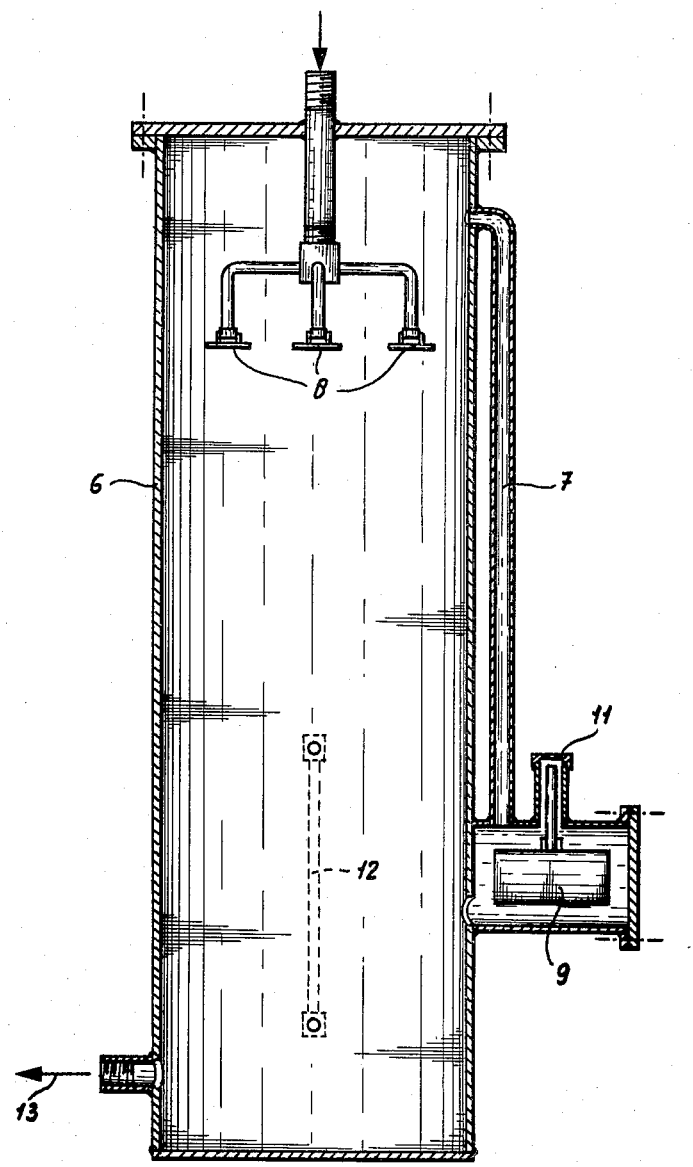
FIG. 2 shows a vertical cross-sectional view of a part of the installation.

Gases from a flash evaporator or ejector condensor pass through a one-way valve 2. This valve opens if a jet-pump 4 provided in a conduit 3 for pressurized water from the flash evaportor does not work. During the sucking of the jet-pump 4 the one-way valve 2 closed and the non-condensable gasses are sucked from conduit 1 and directed with the water of the jet-pump from conduit 3 through a mixing chamber 5 to an absorber 6.

The mixing chamber 5 is there to provide good mixing of the gasses with the water. The mixing chamber is not obligatory and may or may not be used. It is desirable only if an optimal mixing is necessary. The distance from the jet-pump 4 to the carbon dioxide absorber 6 should be as large as possible, in order to guarantee a good mixing of water and gas. The mixture of gas and water enters into the absorber (6) at the top of the same. A spray system consisting of several spray-nozzles (8) is built-in to maintain a good contact of the water and the gasses. In this way as much $CO_2$-gas as possible will be dissolved in the water and will react accordingly.

The reaction formula is as follows:

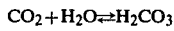

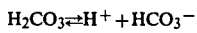

The amount of carbon dioxide gas (free $CO_2$) which dissolves in the water depends on the partial pressure of the carbon dioxide gas only, since no other ions are present.

In the absorber there is a float (9), which serves for automatical control of the liquid level. The level is visible in a guage 12. If the pressure in the absorber 6 increases as a result of cumulation of gasses the liquid level (10) will decrease. The valve (11) will then open and a part of the gasses will escape.

The pressure in the absorber then becomes normal again and the valve (11) will automatically be closed.

The discharge gasses flow through the air-conduit 7 at the top of the absorber; they consist mainly of nitrogen and oxygen. The carbon-dioxide-containing water can be used as such or it may be metered into pumping water or distilled water in order to be mixed with same.

The treated water may flow subsequently through desacidifying- or hardening filters, in order to obtain the hardness desired.

As a filter material calcined dolomite ("Akdolit") may be used, which comprises mainly calcium oxide, calicum- and magnesium carbonate. The water discharged from said filters will comply with Tillmans equilibrium.

Thus, in a very economical way the carbon dioxide from the seawater or from other water treated by distillation is removed and recovered, and subsequently it is dosed into pure water, such that said pure water will obtain the properties desired for human consumption.

I claim:

1. A process for the treatment of distillate water, comprising: recovering distillate water by flash evaporation from impure water, such as sea water, recovering gases desorbed during said flash evaporation, including carbon dioxide, and introducing the same into an absorber, introducing said distillate water into said absorber and intermixing said distillate water with said gases so that substantially all of the carbon dioxide in said gases is absorbed by said distillate water, to thereby improve the property of said distillate water for human consumption.

2. A process according to claim 1, wherein said intermixing of said distillate water and said gases takes place at least in part prior to the same entering said absorber.

3. An installation for heating distillate water, comprising: a flash evaporator, an absorber, first conduit means connecting said flash evaporator to said absorber for introducing gases including $CO_2$, from said flash evaporator into said absorber, second conduit means connecting said flash evaporator to said absorber for introducing distillate water from said flash evaporator into said absorber and means for intermixing said gases and distillate water in said absorber so that said gases and distillate water come into contact with each other and $CO_2$ is absorbed by said water, and conduit means for discharging $CO_2$ -containing water from said absorber.

4. An installation according to claim 3, which comprises means for combining said first and second conduit means, and a mixing chamber between said last mentioned means and said absorber for premixing said gases and distillate water.

5. An installation according to claim 4, wherein said combining means comprises a jet pump.